Nov. 19, 1957 W. B. WEEKLY 2,813,577
BACK AND HEAD REST
Filed Aug. 8, 1955 2 Sheets-Sheet 1
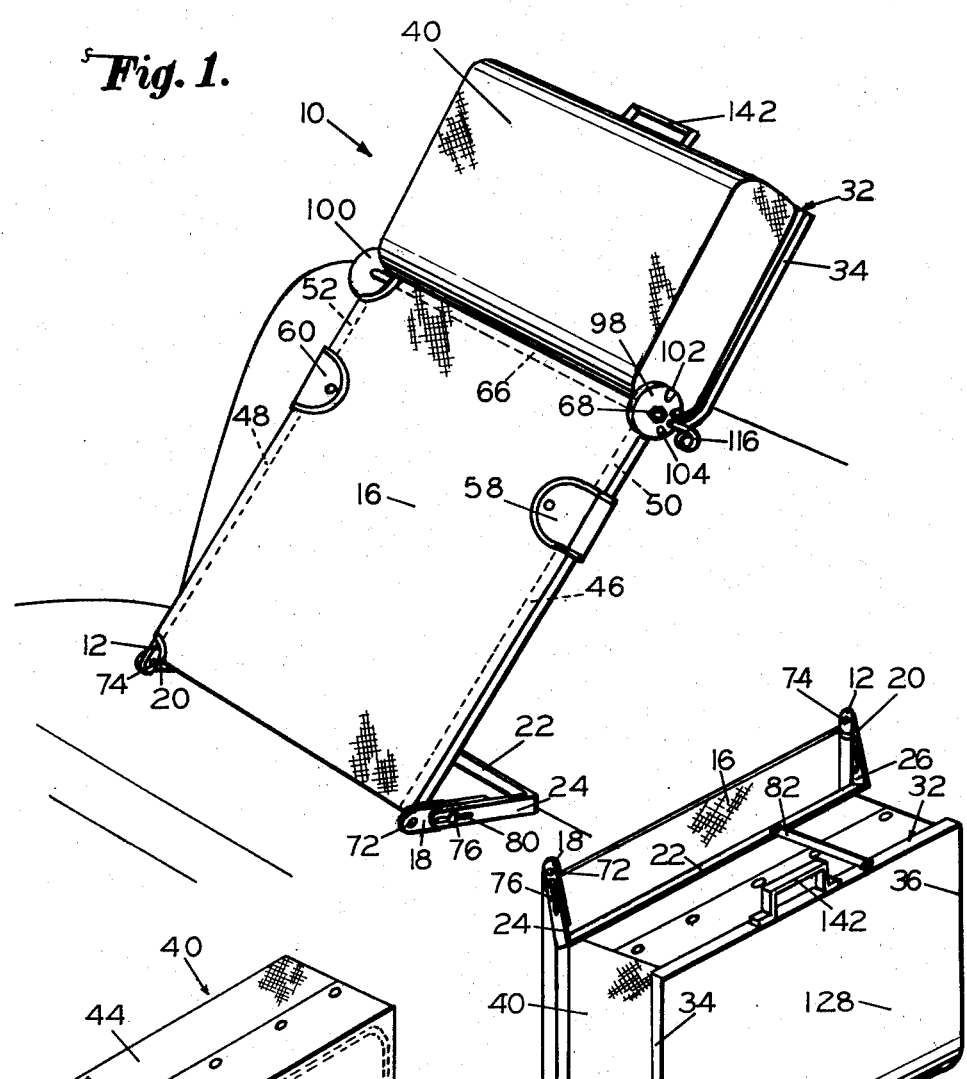
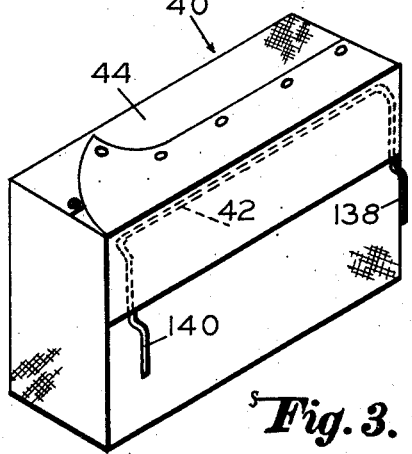
INVENTOR.
W. B. Weekly
BY Arthur H. Sturges,
Attorney Nov. 19, 1957
W. B. WEEKLY
2,813,577
BACK AND HEAD REST
Filed Aug. 8, 1955
2 Sheets-Sheet 2
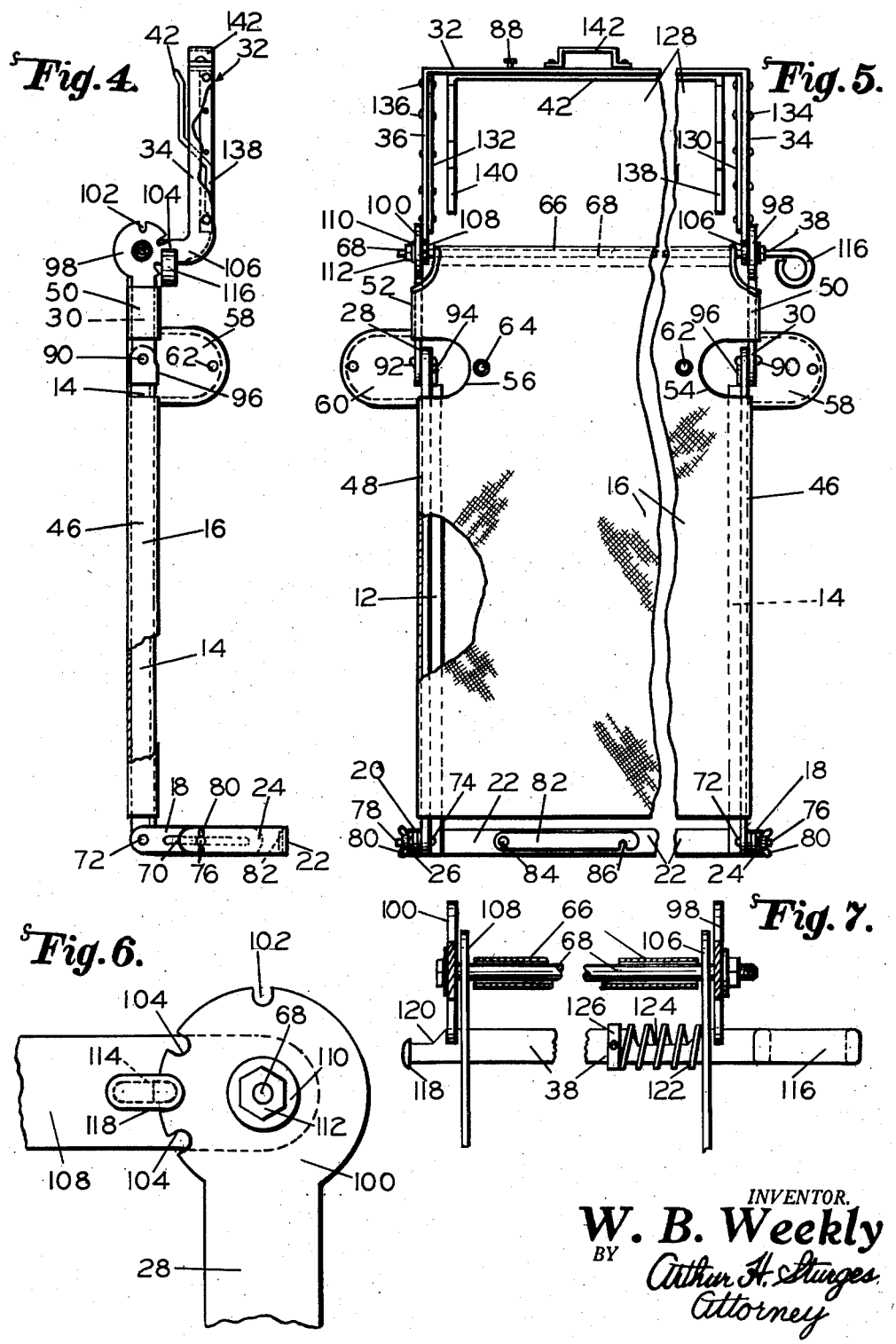
INVENTOR.
W. B. Weekly
BY
Arthur H. Sturges
Attorney United States Patent Office 2,813,577
Patented Nov. 19, 1957

2,813,577

BACK AND HEAD REST

Willis B. Weekly, Los Alamos, N. Mex.

Application August 8, 1955, Serial No. 526,988

3 Claims. (Cl. 155—182)

This invention relates to reclining and resting devices for use in seats of motor vehicles, reclining and other chairs, davenports and the like, and in particular an adjustable frame having a lower back accommodating portion and an upper head resting element with the parts adapted to be positioned at different angles and also adapted to be folded for carrying, storing and shipping.

The purpose of this invention is to provide a combination back and head rest in which the parts are independently adjustable to suitable angles and to different positions to provide complete comfort, and in which the parts are readily folded to provide a compact unit.

Conventional motor vehicle seats are designed to position the operator of a vehicle so that the operator remains alert continuously and is in the best possible position to have complete control of the vehicle at all times, and although such a position substantially insures safe driving it is not the most comfortable position for other occupants of the vehicle. In long trips and particularly in cross country driving where one person rests while another drives it is essential that a comfortable seat be provided so that the person resting will be in condition to drive safely in taking his turn at the wheel.

With this thought in mind this invention contemplates a combination back and head rest that is particularly adapted to be positioned on a seat of a motor vehicle in which the parts are adapted to be adjusted to provide complete rest.

The object of this invention is, therefore, to provide means for forming a frame whereby with the base thereof positioned upon a seat of a motor vehicle the lower portion is adapted to be adjusted to receive the back of a person and the upper portion adjusted to support the head of the person in a comfortable position.

Another object of the invention is to provide a combination back and head rest that is adapted to be used in seats, chairs, davenports and other devices either in the home or in a motor vehicle.

Another important object of the invention is to provide a combination back and head rest that is adapted to be folded to a compact position for carrying, storing and shipping.

It is yet another object of the invention to provide a combination back and head rest in which means is provided for retaining a cushion on the head receiving portion of the device.

A further object of the invention is to provide a combination back and head rest that is adapted to be set up and adjusted by the average layman, so that a skilled mechanic or operator is not required.

A still further object of the invention is to provide a combination back support and head rest which, although being made of light weight material, is of sturdy and durable construction.

And a still further object is to provide a combination back support and head rest which is of simple and economical construction.

With these and other objects and advantages in view the invention embodies a lower frame having side bars with pivotally connected upper sections and having canvas or the like stretched between the bars, an adjustable U-shaped base for supporting the device in adjusted positions, an upper U-shaped frame pivotally connected to the upper sections of the side bars, latching elements for retaining the upper frame in adjusted positions, means for retaining a cushion on the upper frame, and a fabric case providing a cover for the parts with the parts folded.

Other features and advantages of the invention will appear from the following description taken in connection with the drawings, wherein:

Figure 1 is a perspective view illustrating the position of the device as it appears in use in a motor vehicle seat.

Figure 2 is a view showing the device folded.

Figure 3 is a view showing a head rest employed.

Figure 4 is an end elevational view of the frame of the back and seat rest with the cushion omitted and with parts broken away.

Figure 5 is a front elevational view of the improved back and head rest showing the device with the parts extended, and with parts broken away.

Figure 6 is a view illustrating an adjustable connection between one of the upper sections of the side bars and upper portion of the frame, the parts being shown on an enlarged scale and parts of the bars being broken away.

Figure 7 is a cross sectional view also through the parts connecting the upper sections of the side bars to the upper frame showing the latch bar for retaining the parts in adjusted positions, and with parts broken away and parts shown in section.

While one embodiment of the invention is illustrated in the above-referred-to drawings, it is to be understood that they are merely for the purpose of illustration, and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numerals 12 and 14 indicating side bars of the lower portion providing the back support or rest of the device and across which a sheet 16 of canvas or the like is stretched, numerals 18 and 20 arms pivotally connected to lower ends of the side bars, numeral 22 a U-shaped base frame, ends 24 and 26 of which are connected to the arms 18 and 20, numerals 28 and 30 upper sections of the side bars 12 and 14, respectively, numeral 32 an upper U-shaped frame having arms 34 and 36, with offset lower ends, the lower ends being pivotally connected to upper ends of the upper sections 28 and 30 of the side bars, numeral 38 a latch bar for retaining the upper frame in adjusted positions in relation to the lower portion of the device, numeral 40 a cushion adapted to be retained on the upper frame with a spring clip 42, and numeral 44 a cover or case in which the parts may be positioned.

The edges of the sheet of material 16 are hemmed providing tunnels 46 and 48 in which the side bars 12 and 14 are positioned, and upper portions of the sheet on which hems 50 and 52 are provided extend around the upper sections 28 and 30 of the side bars. The upper portion of the sheet is provided with notches 54 and 56 in which the hinged ends of the side bars are positioned, and the sheet is provided with flaps 58 and 60 that are adapted to extend over the notches, as shown in Figure 1. The flaps are secured in closed positions with snap fasteners 62 and 64. The upper end of the sheet is also provided with a hem 66 through which a bolt 68 pivotally connecting the arms of the upper frame to the upper ends of the side bars extends.

The side bars 12 and 14, being formed of angle irons, are L-shaped in cross section, and the arms 18 and 20, which are provided with slots 70, are pivotally connected to side members thereof with bolts 72 and 74. The ends 24 and 26 of the base frame 22 are provided with bolts 76 and 78 on which wing nuts 80 are provided and, as shown in Figure 4, the bolts 76 and 78 extend through the slots 70 of the arms 18 and 20. The base frame 22 is also provided with a latch 82 which is pivotally mounted on the frame with a pin 84, and the extended end of the latch is formed with a notch or hook 86 that is positioned to extend over a button 88 on the frame 32 with the parts folded, as shown in Figure 2.

The upper ends of the side bars 12 and 14 are pivotally connected with pins 90 and 92 to the upper sections 28 and 30, and lower parts of the sections 28 and 30 are formed with dogs 94 and 96 which extend over edges of the bars 12 and 14 thereby providing stops and limiting the opening movement of the upper frame.

The upper ends of the upper sections 28 and 30 of the side bars are formed with circular elements 98 and 100, the upper edges of which are provided with notches 102, and the sides of which are provided with similar notches 104. The notches 102 are positioned to receive the latch bar 38 when the upper frame is folded against the lower portion or back support, as shown in Figure 2, and the notches 104 are adapted to retain the upper frame in suitable adjusted positions. The circular elements 98 and 100 are provided with centrally positioned openings through which the bolt 68 extends, and, as shown in Figures 4 and 5, the arcuate lower ends 106 and 108 of the arms 34 and 36 of the upper frame are also mounted on the bolt 68. The end of the bolt opposite to that on which the head is positioned is provided with a washer 110 and a nut 112.

The latch bar 38 is slidably mounted in openings 114 in the arcuate lower ends 106 and 108 of the arms 34 and 36 of the upper frame 32, and, as shown in Figure 7, one end of the bar is provided with a finger loop 116 and the opposite end is peened over providing a head 118 which prevents the end of the latch bar accidentally sliding through the arm 36. The end of the bar adjacent the head 118 is provided with a recess 120 that is positioned to register with the circular element 100, and a similar recess 124 in the intermediate part of the bar is positioned to register with the circular element 98. The latch bar is provided with a spring 122 that is positioned between the arm 106 and a set collar 126 whereby the latch bar is urged toward the left in the design shown in Figure 7, so that the edge of the bar is retained in one of the notches 102 or 104 of each circular member when released. By this means the position or angle of the upper frame or head rest is readily adjusted by placing a finger through the loop 116 and sliding the bar outwardly or until the recesses 120 and 124 are in registering relation with the circular elements 100 and 98, respectively, and with the upper frame positioned as desired the loop is released and the spring 122 snaps the latch bar into the holding position, as shown.

The upper frame is provided with a plate 128 that is extended between the arms 34 and 36, the plate being secured in position by flanges 130 and 132 at the ends, and the flanges being held with rivets 134 and 136 to the arms 34 and 36. The face of the plate is positioned to provide a backing for the cushion 40 and lower ends 138 and 140 of the spring clip 42, which holds the cushion, are secured to the plate by welding or the like. The upper end of the upper frame 32 is provided with a handle 142 providing means for carrying the back and head rest with the parts folded.

*Operation*

With the parts assembled as shown and described the back and head rest may be collapsed or folded, as shown in Figure 2.

In use the base frame 22 is opened and set to the desired angle and width, and the upper frame is opened and extended upwardly, as shown in Figure 1. By drawing the latch bar outwardly with the finger loop the upper frame and cushion are set to a comfortable position for the head of the person using the device, and with the upper frame in position the latch bar is released so that the head rest is in the correct position for use.

The openings or notches 54 and 56 and flaps 58 and 60 provide access to the hinge joints between the lower and upper portions of the frame to facilitate adjustment thereof.

From the foregoing specification, it will become apparent that the invention disclosed will adequately accomplish the functions for which it has been designed and in an economical manner, and that its simplicity, accuracy, flexibility, and ease of operation are such as to provide a useful yet relatively inexpensive device, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention, that which is claimed to be new and desired to be procured by Letters Patent, is:

1. In a back and head rest, the combination which comprises spaced parallel side bars, upper sections pivotally connected to upper ends of the side bars, an inverted U-shaped upper frame extended upwardly from upper ends of said upper sections, a bolt extended through lower ends of the upper frame and upper ends of the upper sections, a sheet of canvas stretched across the device with tunnels at the edges and upper end and said side bars, upper sections, and bolt being positioned in said tunnels, the upper ends of said upper sections having circular elements with notches therein thereon, a latch bar extended through lower ends of the upper frame and positioned to engage the notches of the circular elements for retaining said upper section in adjusted positions, a cushion retaining clip positioned on said upper frame, and a base pivotally connected to lower ends of the side bars for supporting the device in inclined positions on a seat or the like.

2. In a back support and head rest, the combination which comprises a lower frame including spaced vertically disposed side bars, arms having slots therein pivotally connected to lower ends of the side bars, a U-shaped base frame extended from said arms, bolts extended through the slots of the arms and ends of the U-shaped frame for adjustably connecting the side bars to the frame, upper sections pivotally connected to the upper ends of the side bars, dogs on the upper sections limiting opening movement of said sections, a canvas cover positioned on the lower frame and upper sections thereof, an upper frame having offset arcuate lower ends pivotally mounted on said upper sections, said upper sections having notches in edges thereof, a latch bar extended through the arcuate lower ends of the upper frame and positioned to coact with the notches of said upper sections of the lower frame for retaining the upper frame in adjusted positions, a cushion adapted to be positioned on the upper frame, a plate carried by the upper frame providing a backing for the cushion, and a spring clip for retaining the cushion on said upper frame.

3. In a back and head rest, the combination which comprises a rectangular-shaped frame having parallel side bars connected at the upper ends with a bolt, arms pivotally connected to lower ends of the side bars, a U-shaped frame having slots in the ends connected to the arms with bolts extended through the arms and slots, a sheet of canvas stretched over the frame, and inverted U-shaped upper frame having arms with offset lower ends pivotally mounted on the bolt connecting the upper ends of the side bars, latch elements for retaining the upper frame in adjusted positions, a cushion holding spring clip on the upper frame, and a cushion on the spring clip of the upper frame.

References Cited in the file of this patent

UNITED STATES PATENTS

| | | |
|---|---|---|
| 2,648,373 | Hill | Aug. 11, 1953 |
| 2,735,480 | Meade | Feb. 21, 1956 |